(12) United States Patent
Simmons et al.

(10) Patent No.: US 7,533,750 B2
(45) Date of Patent: May 19, 2009

(54) SUSPENSION FOR TRACKED VEHICLES

(75) Inventors: Val J. Simmons, Logan, UT (US); Kirk Williamson, Logan, UT (US)

(73) Assignee: Simmons, Inc., Providence, UT (US)

( * ) Notice: Subject to any disclaimer, the term of this patent is extended or adjusted under 35 U.S.C. 154(b) by 261 days.

(21) Appl. No.: 11/540,339

(22) Filed: Sep. 28, 2006

(65) Prior Publication Data

US 2007/0227796 A1    Oct. 4, 2007

Related U.S. Application Data

(60) Provisional application No. 60/721,296, filed on Sep. 28, 2005.

(51) Int. Cl.
*B62M 27/02* (2006.01)

(52) U.S. Cl. .................. 180/193; 305/127; 305/128

(58) Field of Classification Search .............. 180/193, 180/9.5; 305/141, 120, 127, 128
See application file for complete search history.

(56) References Cited

U.S. PATENT DOCUMENTS

| 3,111,349 A | 11/1963 | Tucker, Sr. |
|---|---|---|
| 3,527,506 A | 9/1970 | Erickson |
| 3,613,811 A | 10/1971 | Bandli |
| 3,721,308 A | 3/1973 | Brandli et al. |
| 3,773,126 A | 11/1973 | Irvine |
| 3,784,263 A | 1/1974 | Hendrickson et al. |
| 3,788,412 A | 1/1974 | Vincent |
| 3,800,897 A | 4/1974 | Irvine |
| 3,856,099 A | 12/1974 | Bowers |
| 3,863,727 A | 2/1975 | Michrina |
| 3,913,694 A | 10/1975 | Forsgren |
| 3,922,024 A | 11/1975 | Burkhardt et al. |
| 3,931,861 A | 1/1976 | Olson |
| 3,933,213 A | 1/1976 | Trowbridge |
| 3,945,451 A | 3/1976 | Aaen |
| 3,966,004 A | 6/1976 | Rose |
| 3,966,181 A | 6/1976 | Lessard |
| 3,967,692 A | 7/1976 | Hoffman |
| 3,974,890 A | 8/1976 | Noble |
| 4,034,820 A | 7/1977 | Barnhardt |
| 4,082,155 A | 4/1978 | McCartney |
| 4,093,033 A * | 6/1978 | Rosch ............. 180/9.56 |
| 4,133,400 A | 1/1979 | Shiraishi |
| 4,217,006 A | 8/1980 | Dehnert |
| 4,222,453 A | 9/1980 | Fixsen et al. |
| 4,284,161 A | 8/1981 | Blass |
| 4,301,884 A | 11/1981 | Taylor |
| 4,305,476 A | 12/1981 | Blass et al. |
| 4,314,618 A | 2/1982 | Tamura |
| 4,328,878 A | 5/1982 | Yoshida |
| 4,344,637 A | 8/1982 | Williams, Jr. et al. |
| 4,393,953 A | 7/1983 | Boulianne |
| 4,407,386 A | 10/1983 | Yasui et al. |
| 4,431,078 A | 2/1984 | Ebert et al. |

(Continued)

*Primary Examiner*—Paul N Dickson
*Assistant Examiner*—Tashiana Adams
(74) *Attorney, Agent, or Firm*—Briggs and Morgan, P.A.

(57) ABSTRACT

A suspension for a tracked vehicle providing a wide range of performance characteristics via a user-adjustable spring system within a rear suspension portion. An optimum spring force can depend on the both operator characteristics and local operating conditions. A user is afforded the ability to adjust a rear suspension system to provide desired ride characteristics. A suspension system particularly for long-tracked snowmobiles is disclosed.

27 Claims, 16 Drawing Sheets

U.S. PATENT DOCUMENTS

| | | | |
|---|---|---|---|
| 4,462,480 | A | 7/1984 | Yasui et al. |
| 4,518,056 | A | 5/1985 | Kobayashi |
| 4,544,170 | A | 10/1985 | Ebert et al. |
| 4,591,173 | A | 5/1986 | Marier |
| 4,633,964 | A | 1/1987 | Boyer et al. |
| 4,671,521 | A | 6/1987 | Talbot et al. |
| 4,892,164 | A | 1/1990 | Yasui et al. |
| 4,892,165 | A | 1/1990 | Yasui et al. |
| 4,917,207 | A | 4/1990 | Yasui et al. |
| 4,987,965 | A | 1/1991 | Bourret |
| 5,060,745 | A | 10/1991 | Yasui et al. |
| 5,104,205 | A | 4/1992 | Motomura et al. |
| 5,265,692 | A | 11/1993 | Mallette |
| 5,370,198 | A * | 12/1994 | Karpik ................. 180/193 |
| 5,474,146 | A | 12/1995 | Yoshioka et al. |
| 5,564,683 | A | 10/1996 | Stuck |
| 5,586,614 | A | 12/1996 | Kouchi et al. |
| 5,613,570 | A | 3/1997 | Becker |
| 5,660,245 | A | 8/1997 | Marier et al. |
| 5,667,031 | A * | 9/1997 | Karpik ................. 180/193 |
| 5,692,579 | A | 12/1997 | Peppel et al. |
| 5,727,643 | A | 3/1998 | Kawano et al. |
| 5,730,242 | A | 3/1998 | Furusawa |
| 5,791,429 | A | 8/1998 | Bergman |
| 5,881,834 | A * | 3/1999 | Karpik ................. 180/193 |
| 5,904,216 | A | 5/1999 | Furusawa |
| 5,904,217 | A | 5/1999 | Yamamoto et al. |
| 5,944,134 | A | 8/1999 | Peppel et al. |
| 5,947,220 | A | 9/1999 | Oka et al. |
| 6,032,752 | A | 3/2000 | Karpik et al. |
| 6,109,382 | A | 8/2000 | Kubota |
| 6,112,840 | A | 9/2000 | Forbes |
| 6,125,958 | A | 10/2000 | Olson et al. |
| 6,161,908 | A | 12/2000 | Takayama et al. |
| 6,170,589 | B1 | 1/2001 | Kawano et al. |
| 6,206,124 | B1 | 3/2001 | Mallette et al. |
| 6,234,264 | B1 | 5/2001 | Boivin et al. |
| 6,253,867 | B1 | 7/2001 | Lilbacka |
| 6,263,991 | B1 | 7/2001 | Savage et al. |
| 6,283,241 | B1 | 9/2001 | Kubota |
| 6,321,864 | B1 | 11/2001 | Forbes |
| 6,354,391 | B1 | 3/2002 | Cormican |
| 6,354,677 | B1 | 3/2002 | Cook et al. |
| 6,357,543 | B1 | 3/2002 | Kaprik |
| 6,390,219 | B1 * | 5/2002 | Vaisanen ................. 180/193 |
| 6,401,852 | B2 | 6/2002 | Lillbacka |
| 6,450,279 | B1 * | 9/2002 | Imamura ................. 180/193 |
| 6,450,280 | B1 | 9/2002 | Pepka et al. |
| 6,460,646 | B2 | 10/2002 | Kanan |
| 6,467,561 | B1 | 10/2002 | Bovin et al. |
| 6,474,662 | B1 | 11/2002 | Cormican |
| 6,478,098 | B2 | 11/2002 | Boivin et al. |
| 6,494,548 | B2 | 12/2002 | Courtemanche |
| 6,499,551 | B2 | 12/2002 | Karpik |
| RE38,124 | E | 5/2003 | Mallette et al. |
| 6,561,302 | B2 | 5/2003 | Karpik |
| 6,595,309 | B1 | 7/2003 | Savage et al. |
| 6,619,417 | B2 * | 9/2003 | Lemieux ................. 180/182 |
| 6,626,258 | B1 | 9/2003 | Forbes |
| 6,761,236 | B2 | 7/2004 | Hibbert |
| 6,796,395 | B1 | 9/2004 | Berg et al. |
| 6,880,660 | B1 | 4/2005 | Berg et al. |
| 6,926,108 | B1 | 8/2005 | Polakowski et al. |
| 6,991,057 | B2 | 1/2006 | Imamura et al. |
| 7,014,004 | B2 | 3/2006 | Etou |
| 7,040,426 | B1 | 5/2006 | Berg |
| 7,040,438 | B2 | 5/2006 | Yoshihara |
| 7,070,012 | B2 * | 7/2006 | Fecteau ................. 180/9.5 |
| 7,128,180 | B2 | 10/2006 | Polakowski et al. |
| 7,147,074 | B1 | 12/2006 | Berg et al. |
| 2001/0027887 | A1 | 10/2001 | Lillbacka et al. |
| 2001/0030467 | A1 | 10/2001 | Courtemanche |
| 2002/0033290 | A1 | 3/2002 | Vaisanen |
| 2002/0053477 | A1 | 5/2002 | Karpik |
| 2002/0060102 | A1 | 5/2002 | Boivin et al. |
| 2002/0185829 | A1 | 12/2002 | Cormican |
| 2005/0016784 | A1 | 1/2005 | Fecteau |
| 2005/0023060 | A1 | 2/2005 | Blanchard |
| 2005/0183899 | A1 | 8/2005 | Polakowski et al. |
| 2005/0199433 | A1 | 9/2005 | Abe et al. |
| 2005/0274559 | A1 | 12/2005 | Lillbaka et al. |
| 2006/0169510 | A1 | 8/2006 | Visscher |
| 2006/0180370 | A1 | 8/2006 | Polakowski et al. |
| 2006/0185919 | A1 | 8/2006 | Hibbert et al. |
| 2006/0261671 | A1 | 11/2006 | Lemme |

* cited by examiner

SUSPENSION FOR TRACKED VEHICLES

RELATED APPLICATION

This application claims priority from U.S. Provisional Application No. 60/721,296, filed on Sep. 28, 2005, and hereby incorporated by reference in its entirety.

FIELD OF THE INVENTION

The invention relates to snowmobiles and more particularly to suspension systems for snowmobiles.

BACKGROUND OF THE INVENTION

Performance characteristics of snowmobiles, including ride comfort and weight balance, depend upon a variety of systems and components, including the snowmobile suspension. Modern snowmobile suspensions typically include two systems, a front suspension system for the skis and a rear suspension system for the track.

The rear suspension of a snowmobile supports an endless track driven by the snowmobile engine to propel the machine. The track is supported beneath the vehicle chassis by a suspension that is designed to provide proper weight balance and ride comfort by absorbing some of shock as the snowmobile traverses uneven terrain. Most modern snowmobiles utilize a slide rail suspension which incorporates a slide rail along with several idler wheels to support the track. The slide rail typically is suspended beneath the chassis by two or more suspension arms, each arm being attached at its upper end to the chassis of the snowmobile and attached at its lower end to the slide rail. The mechanical linkage of the slide rail to the suspension arms and to the snowmobile chassis typically is provided with springs and one or more shock absorbers, the springs being loaded to urge the slide rails downwardly away from the snowmobile chassis, and the shocks providing dampening forces for improved ride comfort.

A variety of configurations of suspension arms, springs, shocks, and shock rods have been utilized to alter the characteristics and feel of the ride given by a particular suspension system. U.S. Pat. No. 5,265,692 shows a snowmobile track suspension having a pair of generally parallel suspension arms connecting the slide rail to the snowmobile chassis. The lower end of the rear suspension arm has a pivot mount that is movable longitudinally of the slide rail. When this pivot is located at its forward most portion of longitudinal movement (i.e., at the forward end of a longitudinal slot), the suspension arms form a parallelogram with the snowmobile chassis and the slide rail so that upward movement of the front suspension arm is transmitted through the slide rail to the rear suspension arm, causing the slide rail to move upward in an orientation that is generally parallel to the snowmobile chassis. Thus, the front end of the slide rail cannot move higher than the back end of the slide rail. The longitudinal slot into which the lower end of the rear suspension arm is pivotally mounted permits the back end of these slide rails to move higher than the front end of the rails.

In light of the varying characteristics that can be built into a suspension system, a variety of competing suspension systems have been made commercially available, and different types of suspension systems commonly are employed on different types of machines, depending upon their primary usage (e.g., racing, touring, etc.). A need remains for an adjustable suspension system adaptable to perform across a variety of terrain and under diverse conditions.

BRIEF SUMMARY OF THE INVENTION

The present invention relates to a suspension system for a snowmobile that is adjustable by the rider to match the riding conditions and desired performance characteristics. In one embodiment, a system includes a slide rail for engagement with a lower portion of the snowmobile track and suspension arms mounted to the snowmobile chassis and the slide rail. Shocks and springs are provided for urging the slide frame downwardly away from the chassis. The front suspension arms have pivot connections at both ends, one end connected to the snowmobile chassis and the other end connected to the slide frame. The rear suspension arms are pivotally connected to the snowmobile chassis at upper ends and include a pivot connection at lower ends to the slide frame to permit some longitudinal movement of the lower end of the rear suspension arms with respect to the slide frame. An overload spring provides an additional force tending to bias the slide rail away from the chassis. The overload spring force is applied at an intermediate location of the rear suspension arm between the upper and lower ends thereof. The position of the applied spring force can be user-adjusted, such as via a movable transfer block mechanism as further described hereinafter in order to modify performance characteristics of the snowmobile.

Benefits of a suspension incorporating one or more of the present inventions include: improved comfort; controlled machine attitude across a variety of operation speeds and conditions; and minimization of the change or variability of track tension across a variety of operational conditions.

One object of the present invention is the application of an overload spring force to a rear suspension arm at an intermediate location between the upper end and the lower end thereof.

Another object of the present invention is efficient user adjustment of the location of overload spring force application to control the force level transferred to the rear suspension arm.

Another object of the present invention is the application of a helical spring to provide the overload spring force. In one embodiment, the helical spring has an elongated spring arm for transferring the overload spring forces to the rear suspension arm.

Yet another object of the invention is the provision of a user-adjustable transfer block to direct the overload spring force to a particular location on the rear suspension arm. Suspension characteristics of the machine can be adjusted by changing the location of spring force transfer. A movable transfer block capable of sliding along the rear suspension arm is used to change the location of spring force transfer. A plurality of spaced apertures along the rear suspension arm provides a plurality of different positions for coupling the transfer block to the rear suspension arm, thereby providing an operator with a plurality of different suspension performance characteristics. An operator-accessible pin provides for efficient repositioning of the transfer block between locations along the rear suspension arm.

Yet another object of the present invention is an alignment of the rear shock absorber so that the longitudinal axis of shock extension generally intersects the center axis of the upper axle. In comparison, prior art suspensions have the shock extension axis displaced away from the axle axis.

Another object of the present invention is the provision of dual rear shock absorbers with a centrally mounted rear suspension arm positioned between the shock absorbers.

Additional objects of the present invention include provision of an upper idler wheel assembly having a wheel with a diameter between 6⅜" to 8" and provision of a rear suspension arm having a length of between 21" to 24". The use of a set of intermediate idler wheels between the drive wheel and the rear upper idler wheels for minimizing track rippling and/or vibrations during use. A movable upper axle can be used to adjust the angular relationship between the shock absorber, the rear suspension arm and the slide rail and/or chassis.

Yet another object of the present invention is the provision of a shock axle adjuster having a plurality of stops each of which are differently spaced from an adjuster aperture to position the shock axle at predefined positions relative to the chassis.

A method of optimizing the performance of "long-track" machines (having track lengths of between 144" to 166" or greater) is also provided wherein the distance DL1 (distance between rear wheel 200 and closest suspension linkage 202) is minimized.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Applicant has found that prior art suspensions appear optimized for certain conditions, but perform less optimally in other conditions. For example, in relatively deep powder, it may be particularly desirable to permit the front end of the slide rail suspension to move higher than the rear of the suspension, making it somewhat easier for the snowmobile track to plane out or rise above the powdery snow. Similarly, deep powder handling and performance are related to the degree to which the back end of the slide rails is permitted to rise above the front end of the slide rails (or, in other words, the extent to which the machine is permitted to "rock backwards" on the suspension).

Figure 15:
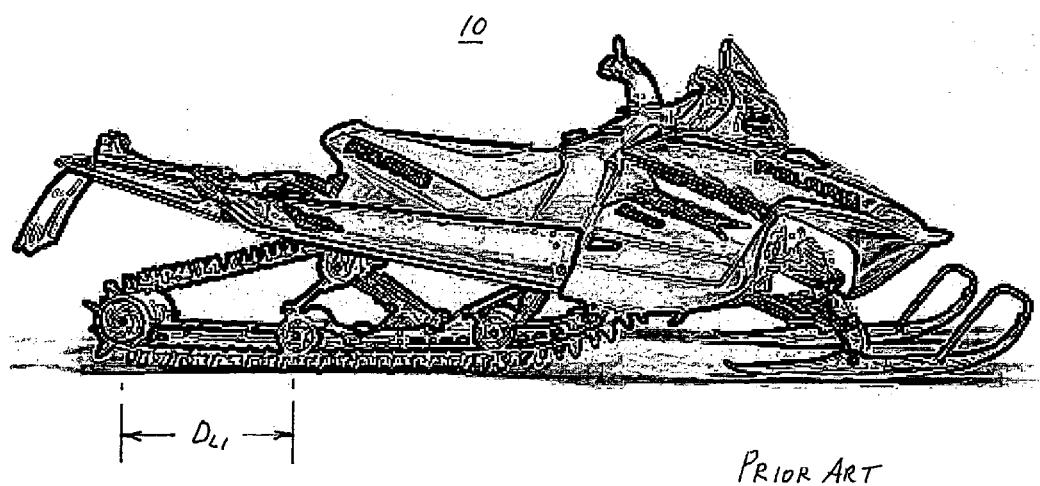
FIG. 15 is an illustration of a snowmobile of the prior art.

FIG. 15 is an illustration of a currently available machine having a track lengths of greater than 166 inches, a so-called "long-track" machine. As track length has been extended, the slide rail length has also increased to accommodate these longer tracks. The industry has responded to longer track lengths by simply extending the slide length and otherwise maintaining the geometry of existing rear suspensions. As shown in FIG. 15, the slide rails are extended and the distance between the rear wheels and the suspension linkage has been dramatically increased in comparison to shorter track machines. The distance, DL1, represents the distance between the rear wheel center 202 and the closest suspension linkage 200. The distance, DL1, is often greater than 12 inches. The industry's solution of simply increasing the slide rail length and maintaining existing rear suspension geometry to accommodate longer tracks has significantly limits the deep snow performance characteristics of the machine.

FIGS. 1-14 depict portions of a snowmobile 10 having a rear suspension system for supporting the machine and for defining the path of the track 12 which propels the machine across the snow. Although the invention can be utilized in connection with a variety of rear suspension configurations, the invention will be described in the context of a particular preferred rear suspension illustrated in the drawings. Such a suspension includes a front suspension arm 14 and a rear suspension arm 16, each arm extending downwardly and rearwardly from pivot connections to the snowmobile frame or chassis (often referred to as the "tunnel"). The lower end of each such arm 14, 16 is secured, either directly or indirectly, to the slide rail 30, beneath which the track slides. As the snowmobile tunnel obscures the rear suspension, FIGS. 2-14 depict the suspension elements as removed from the machine 10.

Figure 3:
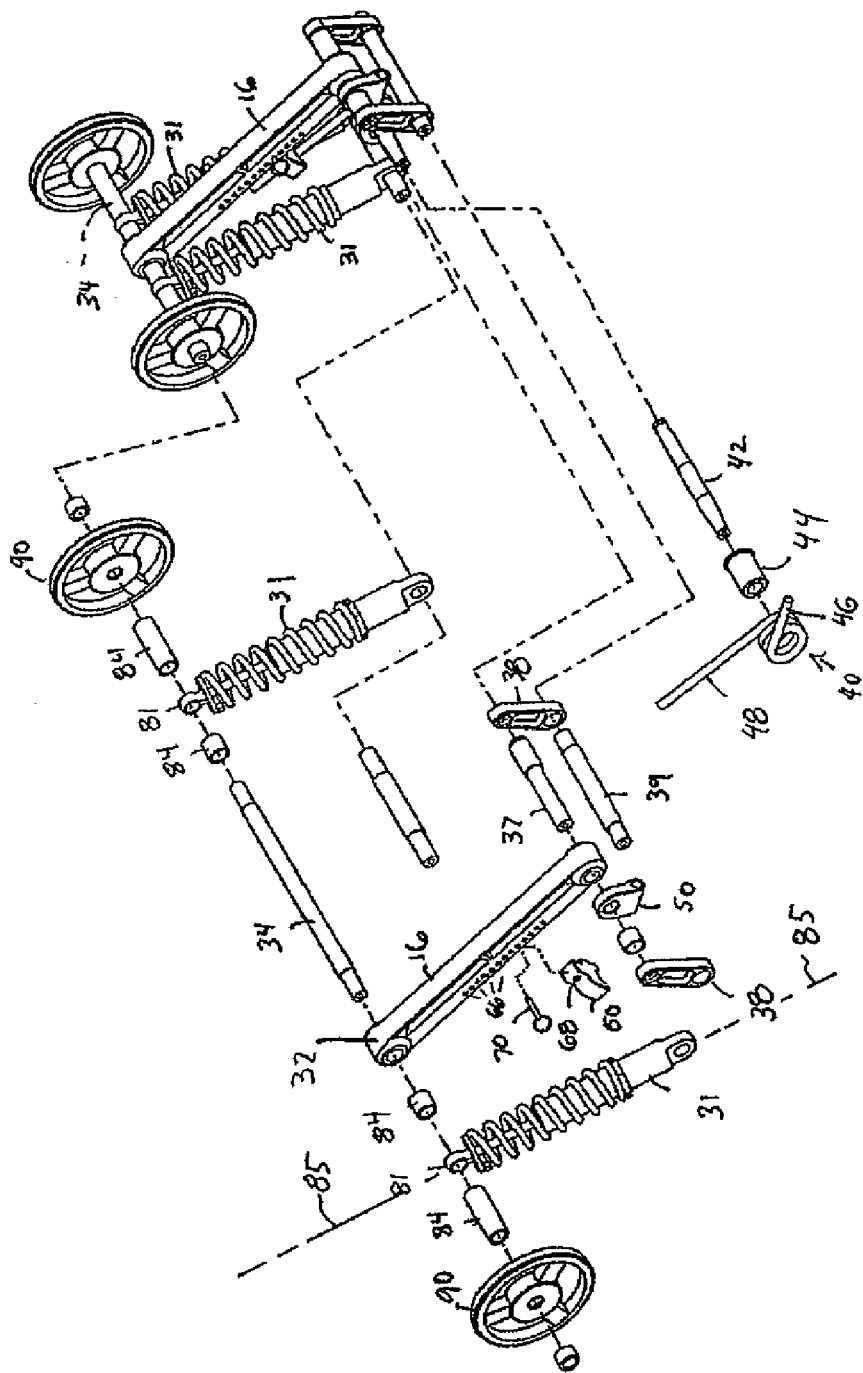
FIG. 3 is an illustration of a portion of the rear suspension of the snowmobile of FIG. 1 shown in assembled and exploded format.
Figure 4:
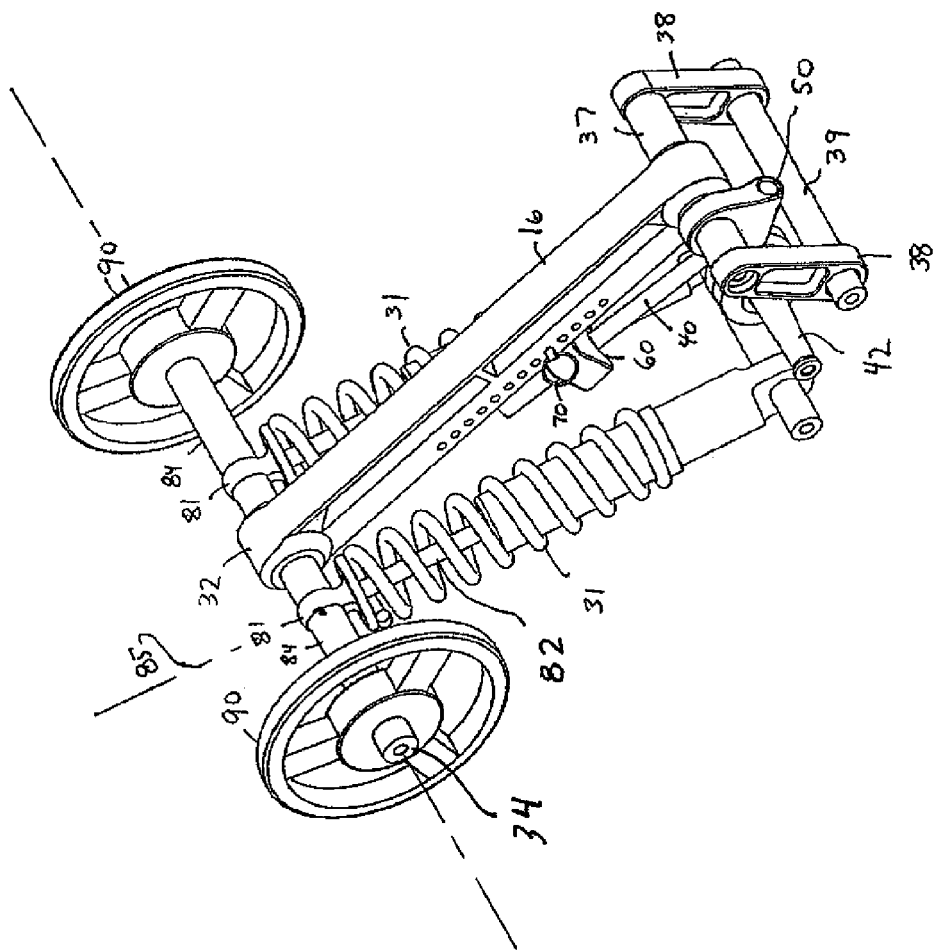
FIGS. 4-7 are illustrations of a portion of the rear suspension of FIG. 1.
Figure 5:
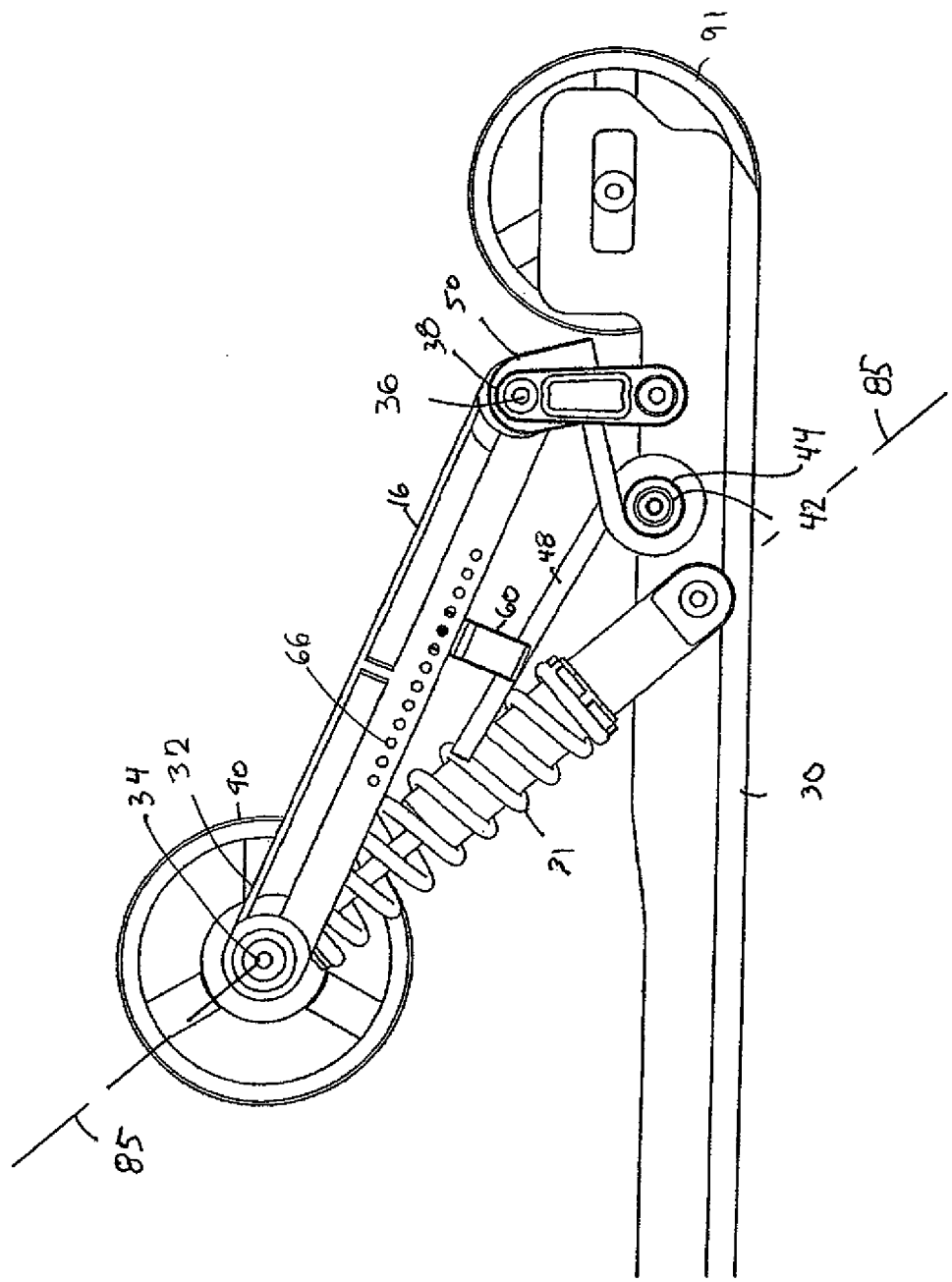
Figure 6:
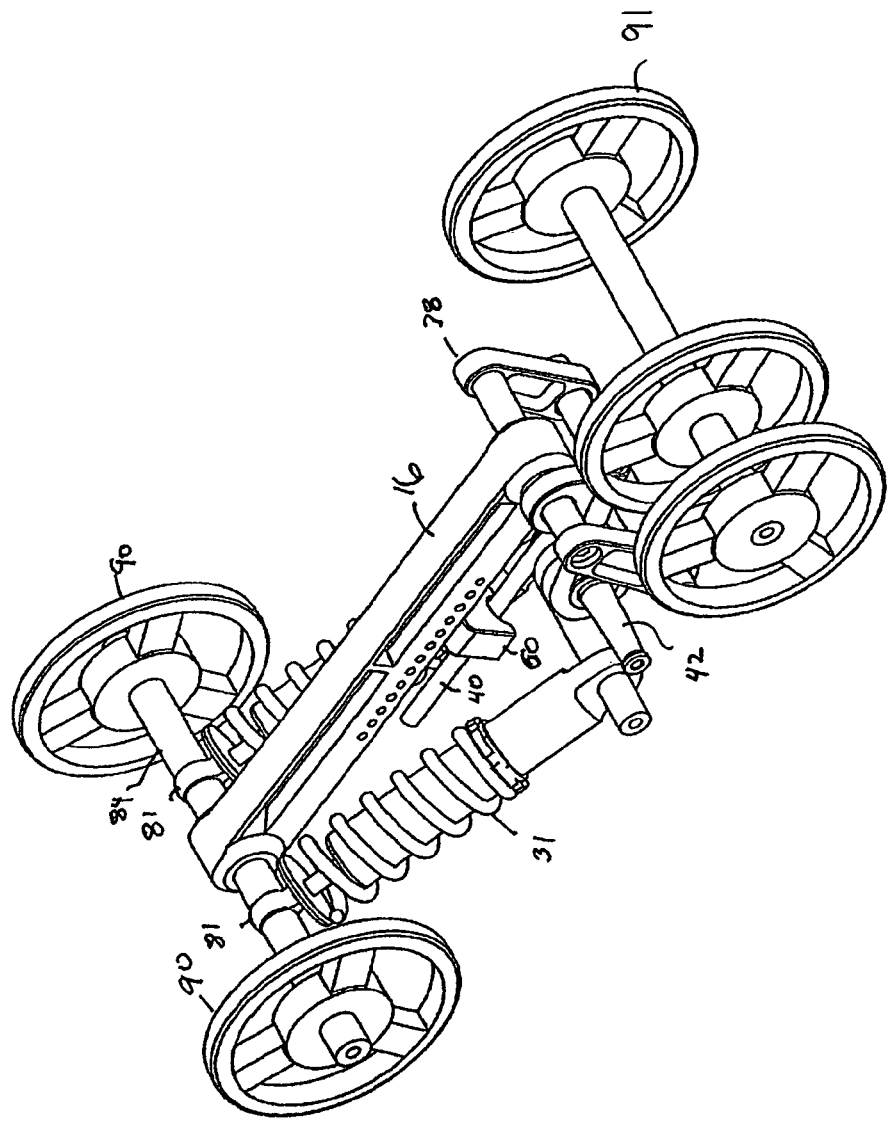

Springs and shock absorbers 31 are provided to urge the slide rail 30 down and away from the snowmobile tunnel. Springs and shocks 31 act to control the relative movement of the suspension with respect to the chassis as the snowmobile moves over terrain of varying contours. Preferably, the rear suspension arm 16 is centrally positioned between the pair of rear shock absorbers 31 as shown in FIG. 3. The relative lengths and orientations of the suspension arms 14 and 16 also control the movement and orientation of the suspension as it is compressed upwardly toward the chassis.

Figure 16:
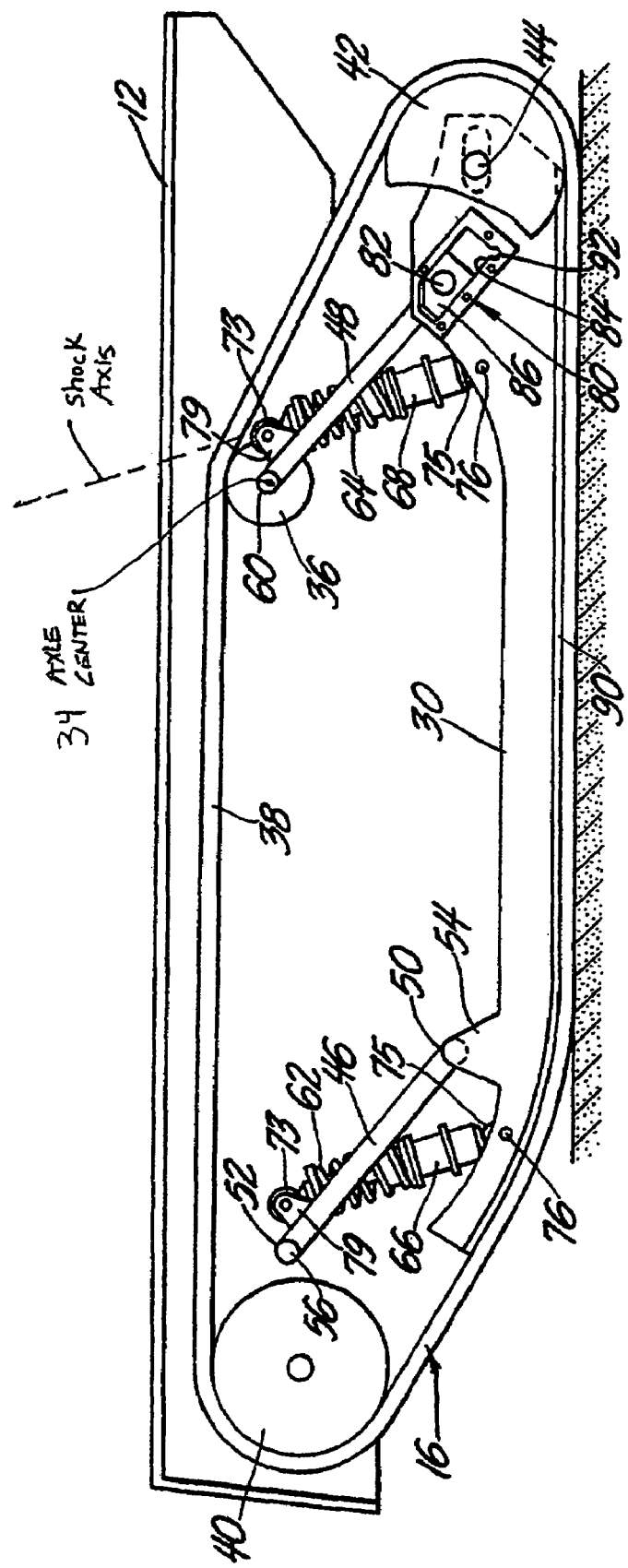
FIG. 16 is an illustration of a rear suspension of a snowmobile of the prior art.

Shock absorbers 31 are connected between upper axle 34 and slide rail 30. Shocks 31 include shock stem 82 attached to an upper shock mount 81. Shock mount 81 is retained upon upper axle 34 by a journal bearing, etc. and is generally free to rotate relative to upper axle 34. A plurality of spacers 84 position the upper shock mount upon axle 34. Shocks 31 compress and retract in a direction of elongation 85 which is aligned to generally intersect the center axis of axle 34. Shocks 31 include shock stems 82 which are aligned in the direction of elongation 85 so that shock stems 82 are aligned to generally intersect the center of axle 34. In comparison, the shock center of typical prior art suspensions is offset relative to the axle 34 as shown in FIG. 16. Similarly, the front shock of the suspension system of FIG. 16 is offset relative to the front axle.

Referring to FIGS. 2-5, upper end 32 of rear arm 16 is pivotally connected to the snowmobile chassis via upper axle 34. The lower end of arm 16 is connected to a pair of lower pivot arms 38, which in turn are pivotally connected to slide rail 30. The linkage of arm 16 with pivot arms 38 permits the front of the slide rail 30 to rise substantially independently of the rear portion of the slide rail. A pivot axis 36 is generally defined as the center of stub shaft 37. The lower ends of pivot arms 38 are pivotably couple to the slide rail 30 via shaft 39. Upper axle 34 also carries a pair of upper idler wheels 90. Rear idler wheels 91 are carried on the slide rail 30.

Figure 8:
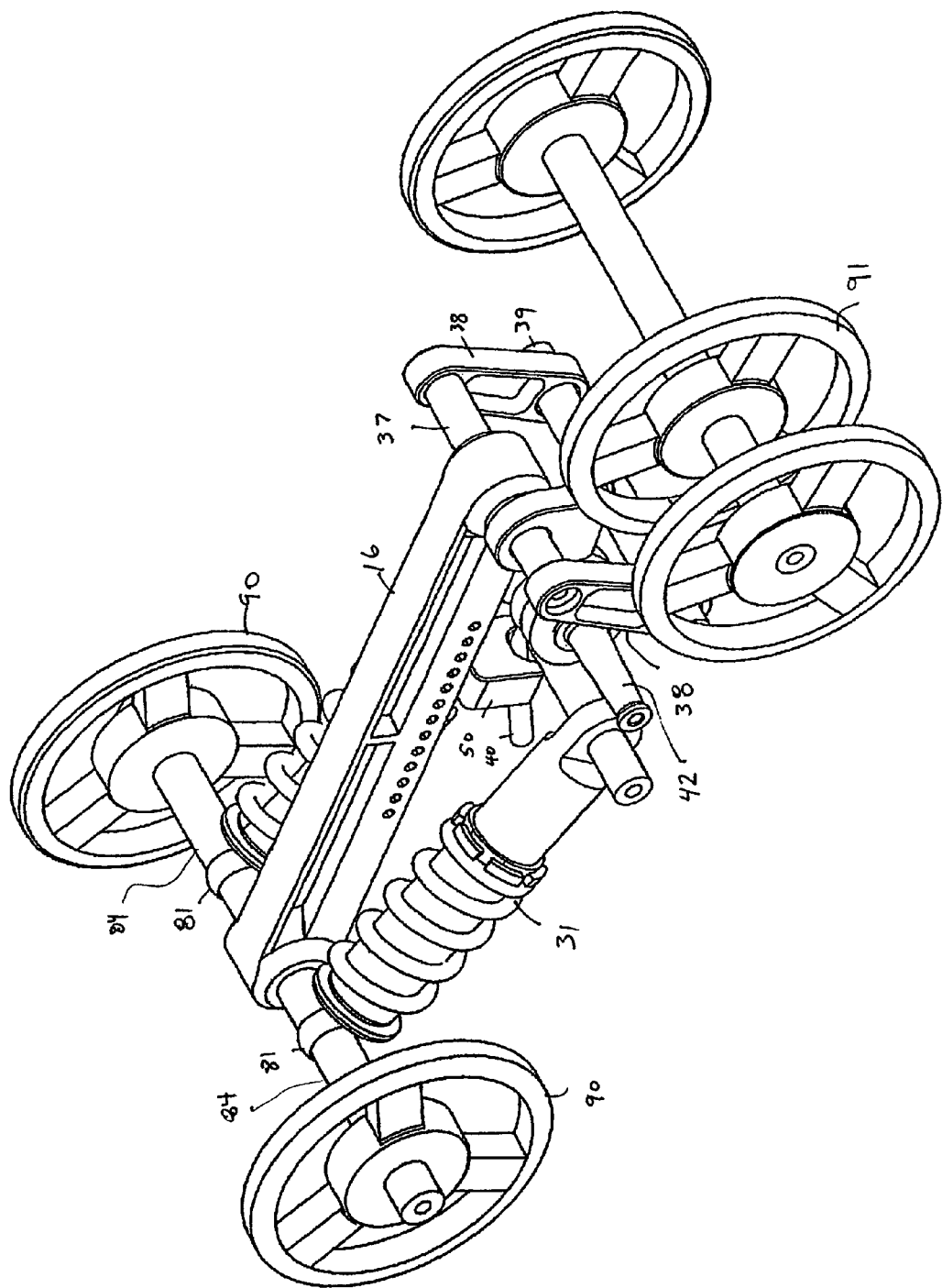
FIG. 8 illustrates components of the rear suspension in a compressed state.
Figure 9:
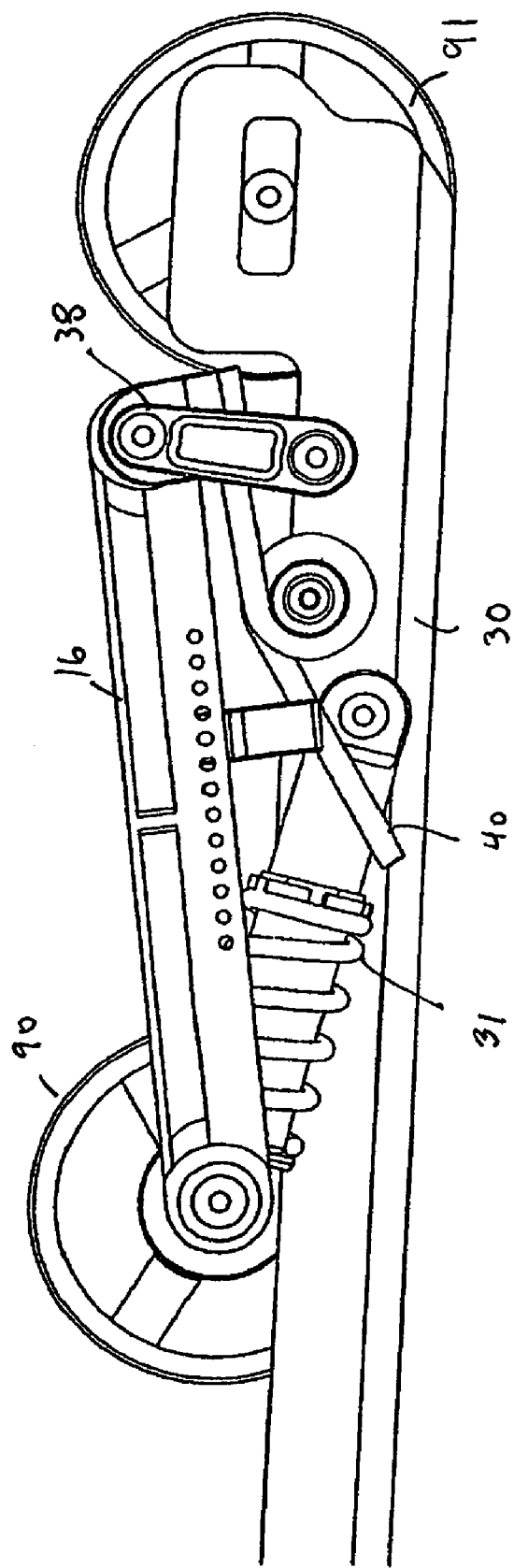
FIG. 9 illustrates components of the rear suspension in a fully compressed state.
Figure 10:
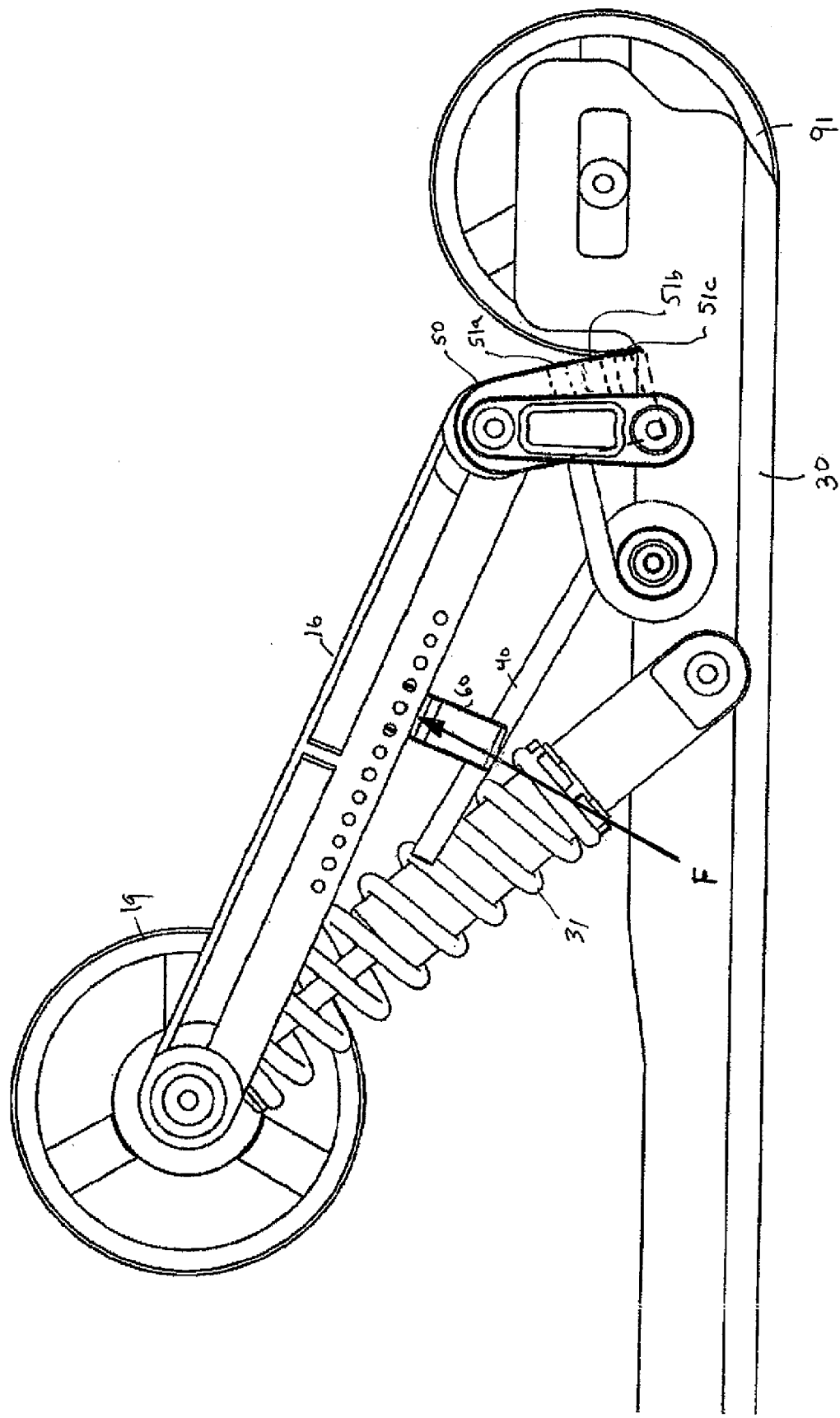
FIGS. 10 and 11 illustrate another embodiment of a rear suspension in accordance with the present invention.
Figure 11:
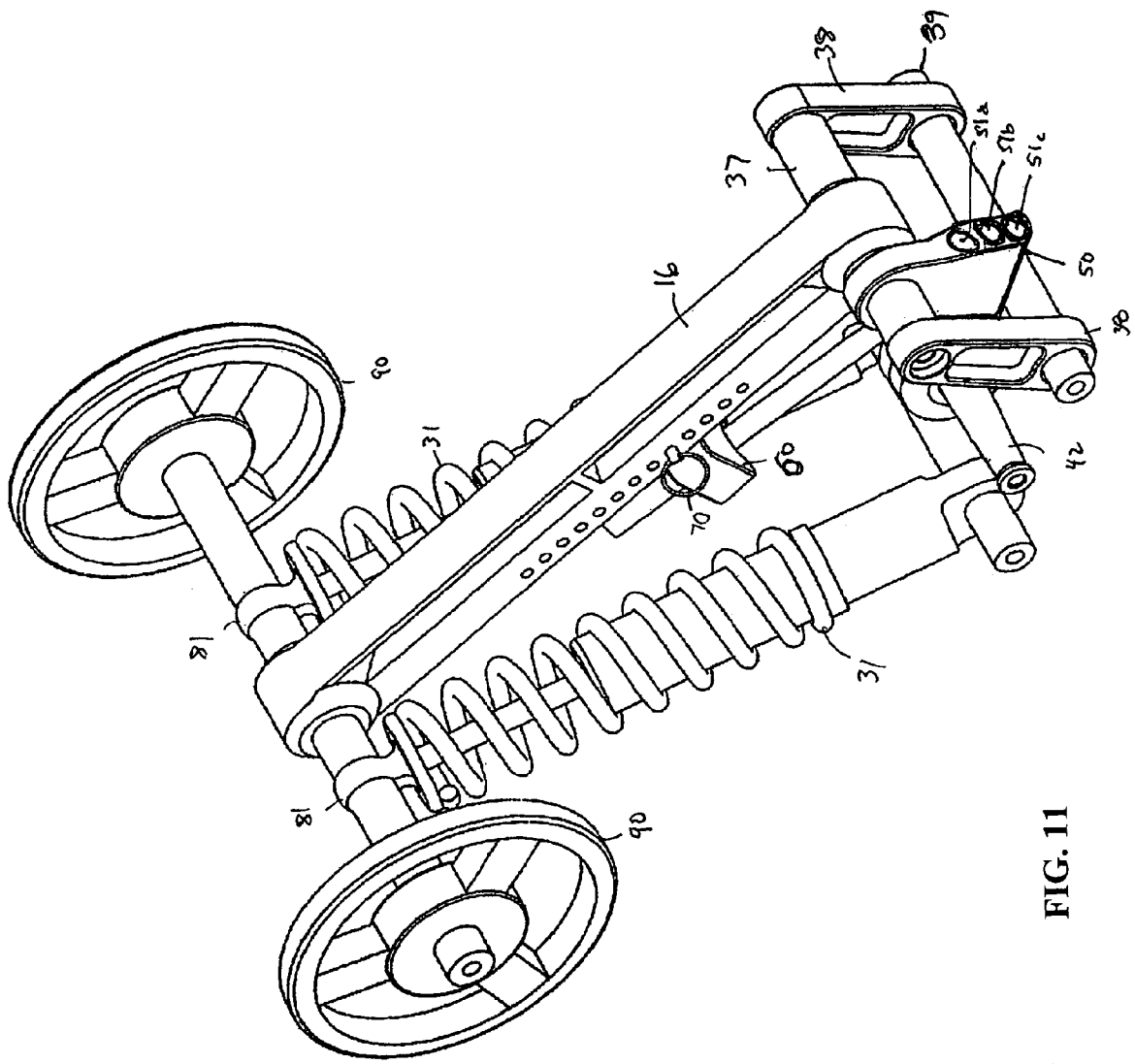

Referring to FIGS. 5-9, the suspension system includes an overload spring 40 which provides an overload spring force to the rear suspension arm tending to bias the rear suspension arm away from the machine chassis. Overload spring 40 is shown as a helical coil spring connected to the slide rail 30 by a shaft 42 and bearing 44 and including a pair of extended spring arms 46, 48. A portion of arm 46 is received within and retained by a retainer 50 which is connected to stub shaft 37. Arm 46 may slide into and out of an aperture 51 of retainer 50 during machine operation. Retainer 50 is generally freely journaled about stub shaft 37. Another embodiment of spring retainer 50 is illustrated in FIGS. 10 and 11. In the embodiment of FIGS. 10 and 11, spring retainer 50 has a plurality of apertures 51a, 51b, 51c into which the portion 46 of spring arm 40 can be received. The spring force, F, applied to the rear suspension arm 16 can be varied by selecting a different aperture 51a, 51b, 51c. Alternative embodiments of a spring retainer 50 would be appreciated by those of ordinary skill in the art. For example, a spring retainer 50 may have opposed apertures 51 having different distances away from the shaft 37 so that the spring force is varied depending on the particular aperture chosen.

Referring again to FIGS. 5-9, arm 48 of overload spring 40 extends generally upwardly relative to the slide rail 30 and engages a transfer block 60 connected to the rear suspension arm 16. Arm 48 of spring 40 engages the transfer block 60 in a sliding relationship and transfers an overload spring force, F, to the rear suspension arm 16 tending to bias the slide rail 30 away from the chassis. Transfer block 60 slides within a channel 64 defined within suspension arm 16. A plurality of spaced apertures 66 are provided on suspension arm 16. Apertures 66 are sized relative to an aperture 68 of transfer block 60 and a removable retaining pin 70 so that pin 70 is capable of retaining the transfer block 60 at an intermediate location between the upper end and lower end of rear suspension arm 16.

Figure 7:
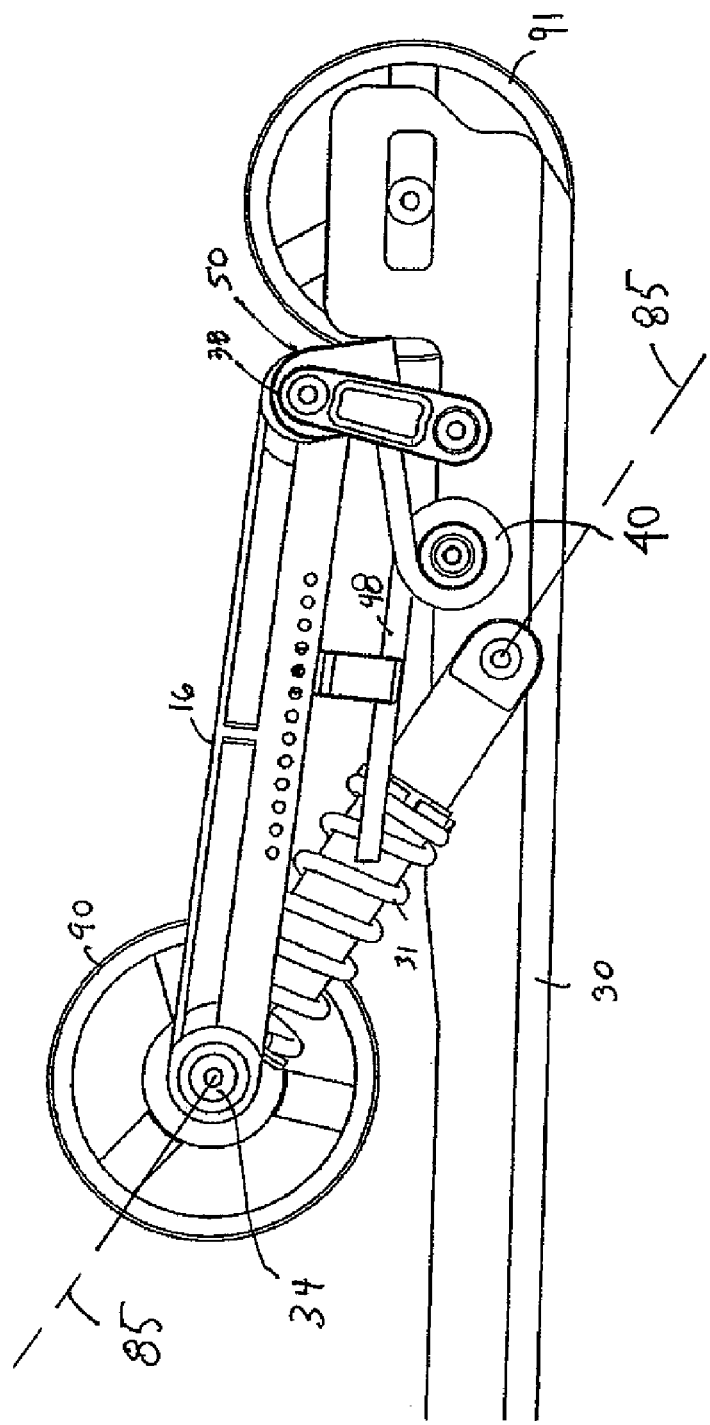

FIGS. 7 and 8 depict the rear suspension in a load-carrying condition. FIG. 9 depicts the rear suspension at a fully compressed load-carrying condition.

Figure 12:
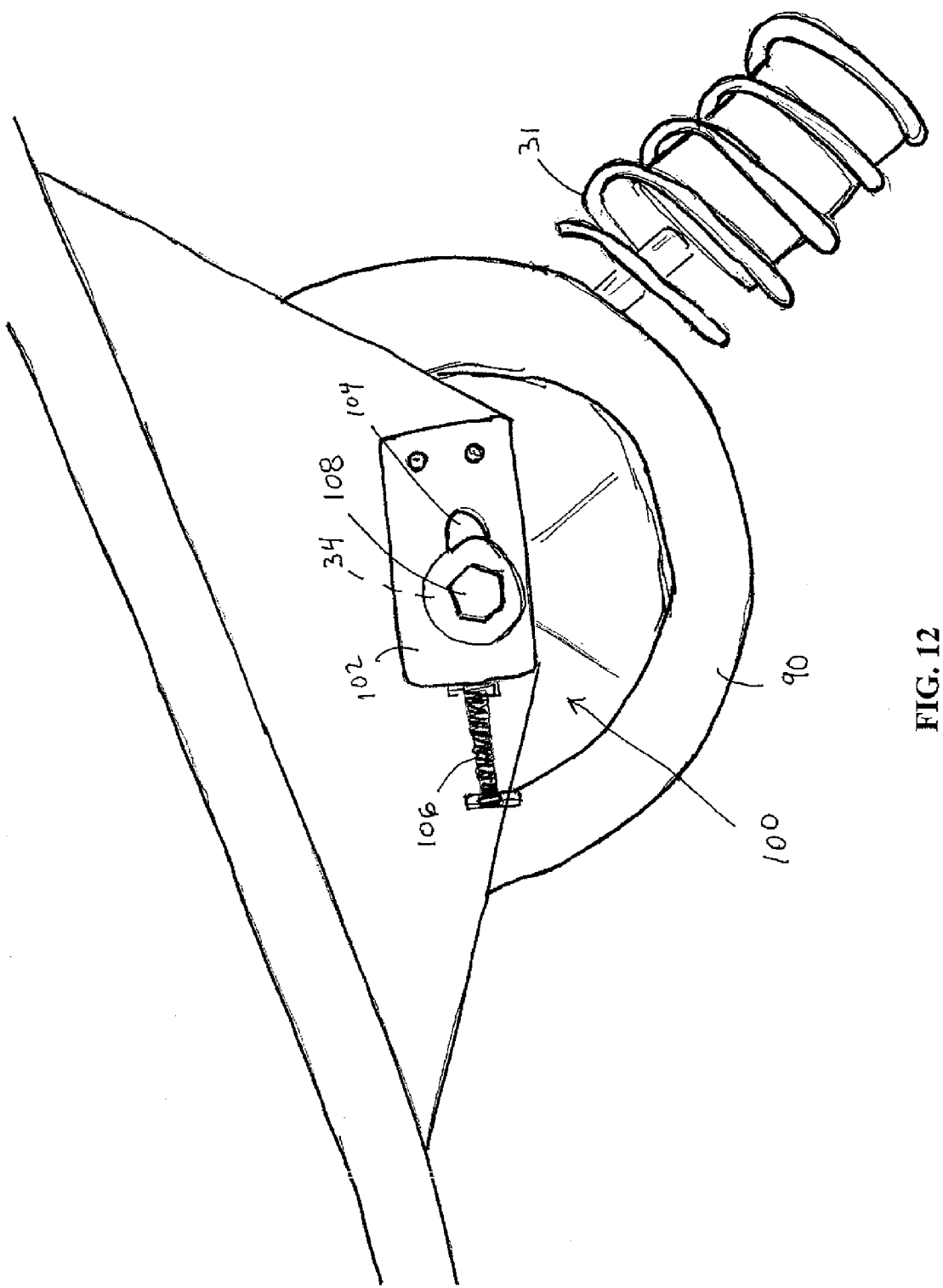
FIG. 12-14 illustrate portions of a rear suspension of a snowmobile.

FIG. 12 illustrates an embodiment of an axle adjuster, generally indicated as numeral 100. Axle adjuster includes a plate 102 having a slot aperture 104 defining a range of positions through which idler axle 34 can be positioned. A first threaded fastener 106 positions the axle 34 and a second threaded fastener 108 secures the axle 34 to the plate 102 to maintain the axle in the selected position. A duplicate axle adjuster 100 would be located on the opposite side of axle 34 (not shown).

Figure 13:
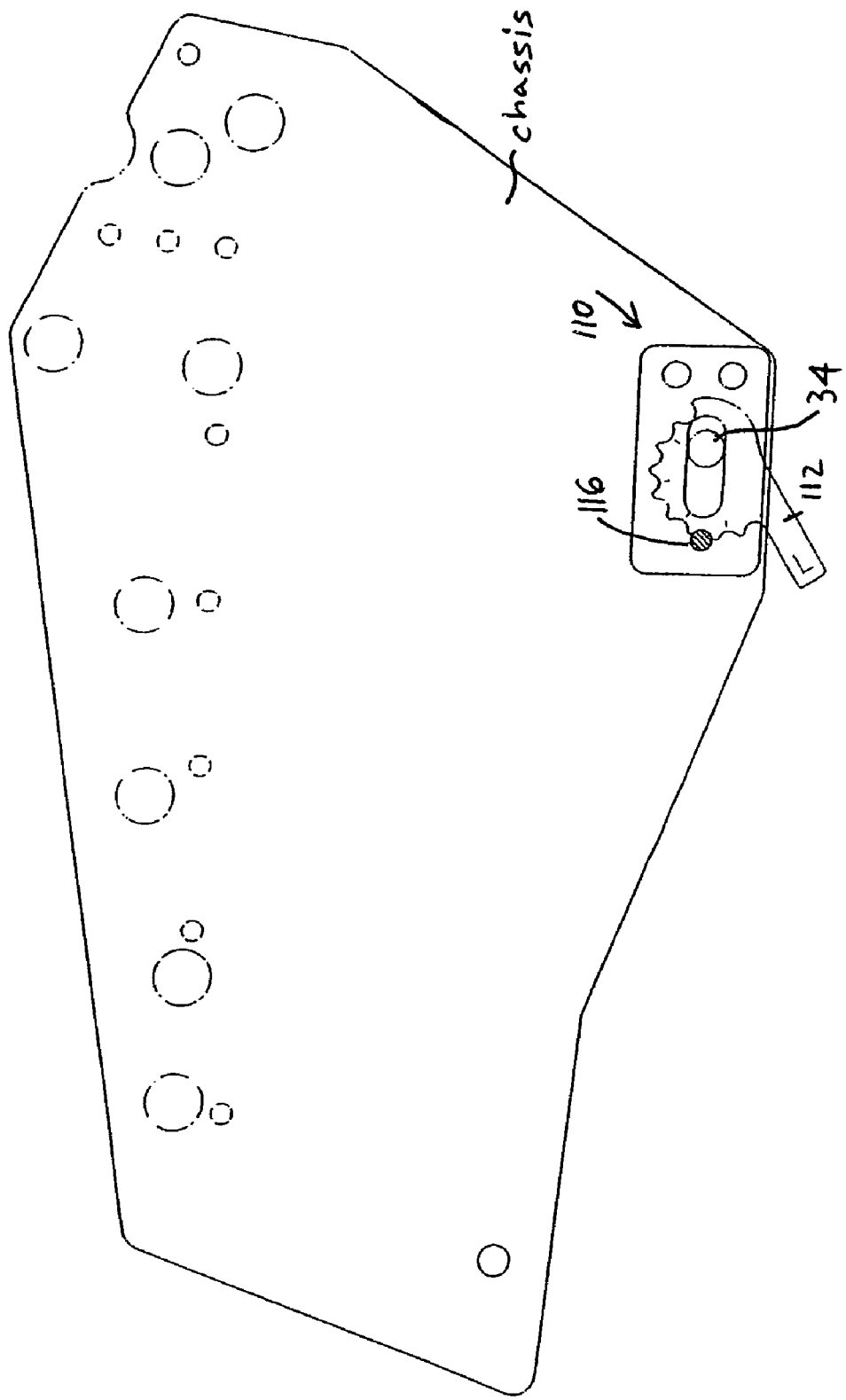
Figure 14:
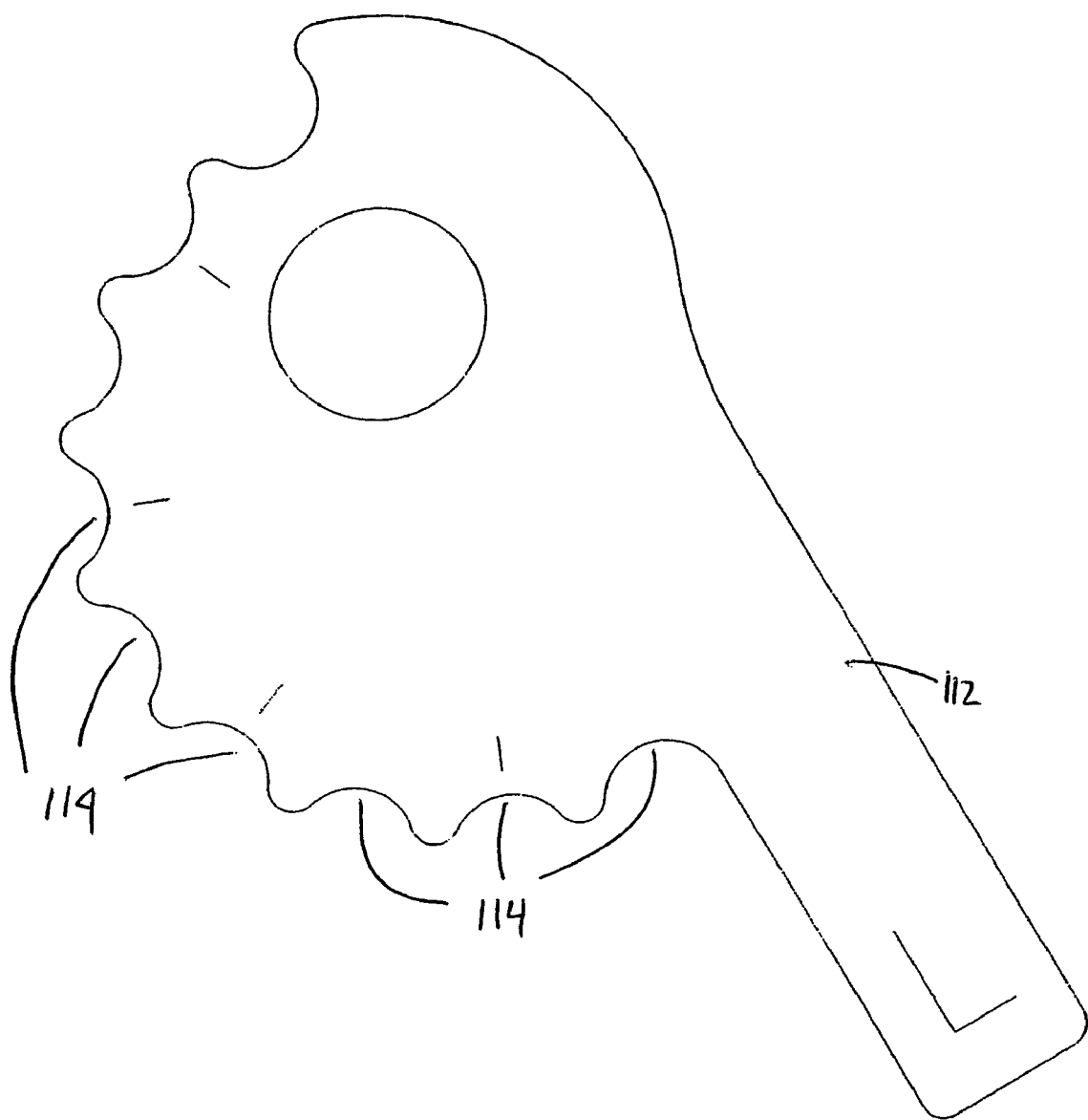

FIGS. 13 and 14 illustrated another embodiment of an upper axle adjuster, generally indicated as numeral 110. Axle adjuster 110 includes a plate 112 having a plurality of stops 114 which are differently spaced from a center 114. Stops 114 engage a pin 116 coupled to the chassis. Axle 34 engages the plate center 114 so that as plate 112 is rotated the distance between the axle 34 center and the pin 116 changes. A duplicate assembly would be located at the opposite end of axle 34 (not shown) and together the assemblies 110 would be used to position the axle 34 relative to the chassis. As the rear suspension arm 16 and shock absorbers 31 are directly coupled to axle 34, the movement of axle 34 relative to chassis also adjusts the angular orientation of the rear suspension arm 16 and the shock absorbers 31 relative to the chassis. A threaded fastener (not shown) similar to the second threaded fastener 108 of FIG. 12 can be used to secure the plate 112 to the chassis and temporarily fix the orientation of axle 34, shock absorbers 31 and rear suspension arm 16 relative to the slide rail 30.

One aspect of the present invention is the application of an overload spring force to a downwardly angled rear suspension arm 16 at an intermediate location between the upper end and the lower end thereof. The operator is afforded efficient adjustment of the location of the overload spring force application by manipulation of a user-adjustable transfer block 60. Upon removal of pin 70, the transfer block 60 is capable of sliding along the rear suspension arm 16 during repositioning to change the location of spring force transfer. The use of a plurality of spaced apertures 66 along the rear suspension arm 16 provides a plurality of positions for coupling the transfer block 60 to the rear suspension arm 16. Movement of the transfer block 60 along the rear suspension arm 16 effectively changes the level of spring force applied by the overload spring 40 to the rear suspension arm 16. For example, the spring force will be greater when the transfer block 60 is closer to the spring 40 center and decrease as the transfer block 60 is positioned further away along the rear suspension arm 16.

Another unique feature includes the use of a spring retainer 50 having a plurality of different apertures 51, wherein the spring arm 46 of the overload spring 50 is inserted into one of the apertures 51 to achieve a particular performance characteristic and, when desired, another aperture can be selected to achieve a different performance characteristic.

Yet another unique feature is the provision of dual rear shock absorbers 31 with a centrally mounted rear suspension arm 16 positioned between the shock absorbers 31.

The provision of an upper idler wheel assembly having wheels 90 of a diameter between 6⅜" to 8" is novel. The provision of rear suspension arm 16 having a length of between 21" to 24" is also novel. The use of a set of intermediate idler wheels 142 between the drive wheel 144 and the rear upper idler wheels 90 for minimizing track rippling and/or vibrations. Aspects of the present invention provide variability to the position of the transfer block 60, thereby giving the rider some control over the performance characteristics of the suspension. Though not illustrated, a similar hydraulically adjustable element could also be used to provide the overload spring force. In addition to the adjuster block and hydraulic system, persons of average skill in the art will recognize that other equivalent mechanical stops and/or linkages may be provided that perform the function of providing adjustable force transfer locations to the suspension arm.

FIG. 15 is an illustration of a currently available machine having a track length of 166 inches, a so-called "long-track" machine. As track length has been extended, the slide rail 30 length has also increased to accommodate these longer tracks.

The industry's solution of simply extending the slide rail length and otherwise maintaining the geometry of existing rear suspensions inhibits machine performance. Applicant has found that existing long tracked machines have significant track tensioning problems when operated across aggressive terrain. It is believed that the track tensioning problems are related to the substantial distance between the rear idler wheels and the slide rail connection of the closest rear suspension linkage. As shown in these photographs, the slide rails have been extended and the distance between the rear idler wheels and the suspension linkage has been dramatically increased in comparison to shorter track machines. The distance, DL1, represents the distance between the rear wheel center 202 and the connection point of the closest rear suspension linkage 200. The distance, DL1, is often greater than 12 inches.

Figure 1:
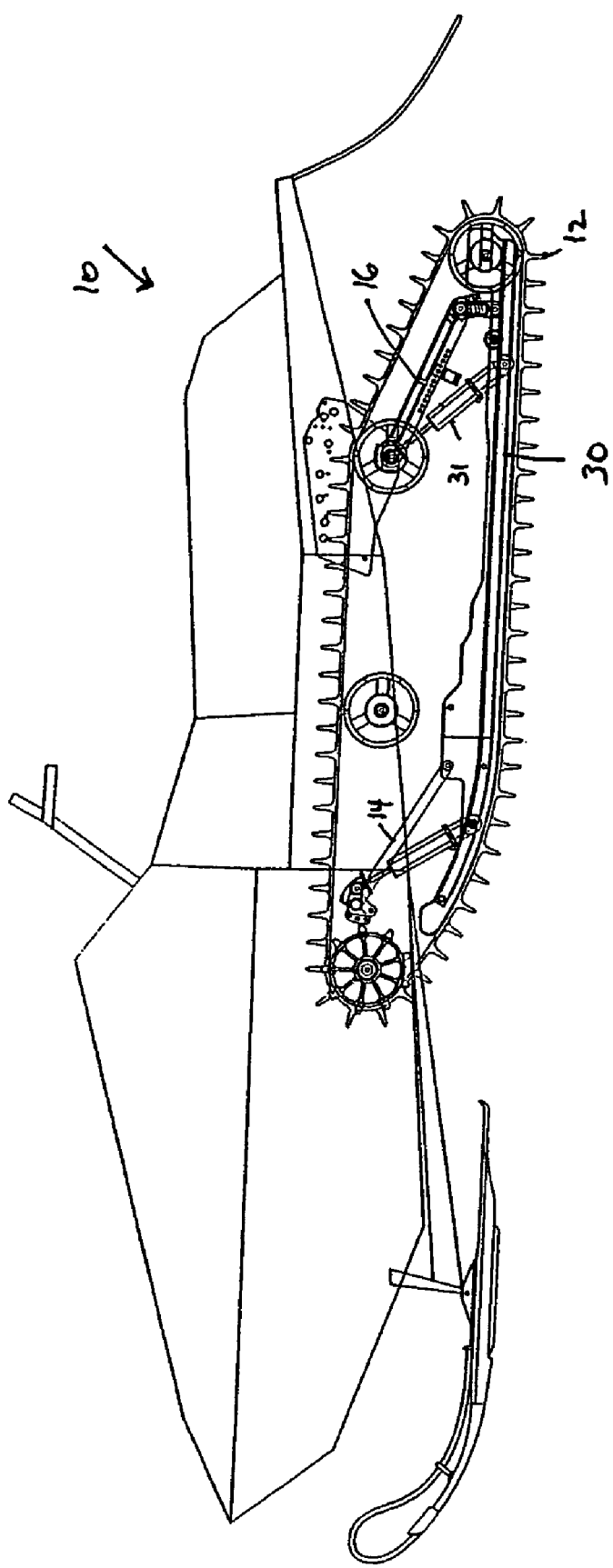
FIG. 1 is an illustration of a snowmobile in accordance with the present application.
Figure 2:
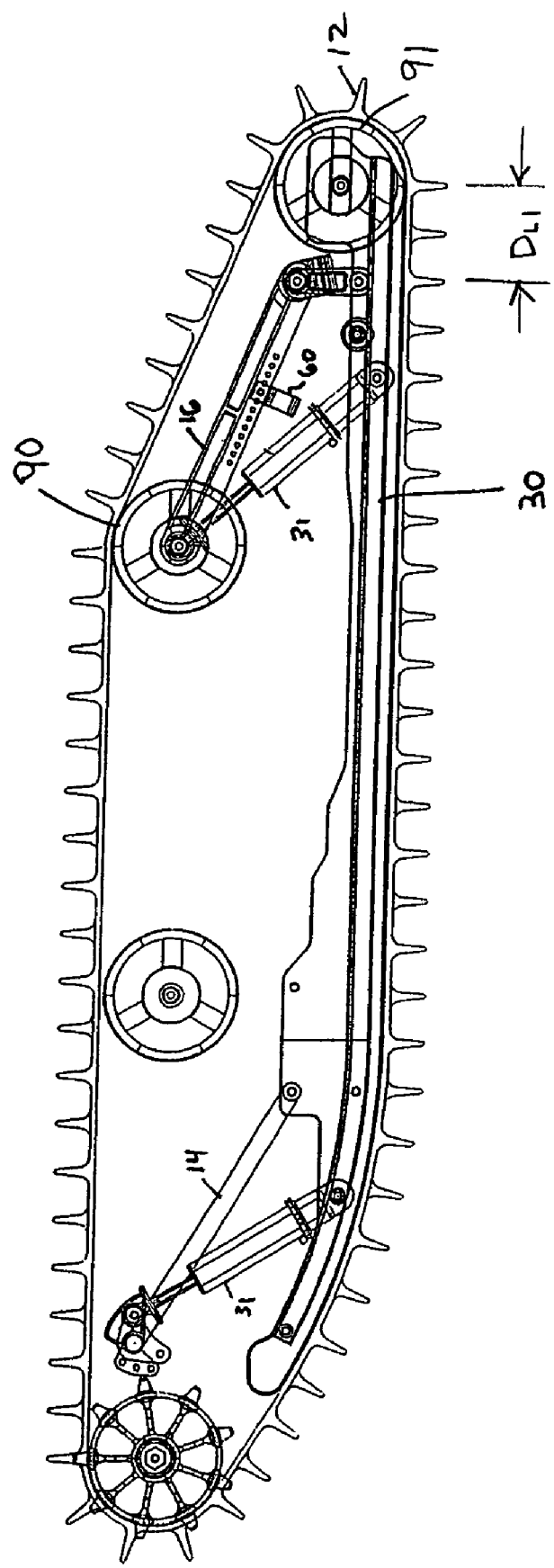
FIG. 2 illustrates a portion of the snowmobile of FIG. 1 including components of a rear suspension of the machine of FIG. 1.

One aspect of the present invention is the provision of a long-tracked machine (having a track length of at least 144") wherein the distance between the rear wheel center 202 and the closest rear suspension linkage 200 is minimized. As shown in FIG. 2, a machine according to the present invention has a DL1 of approximately 5." DL1 represents the distance between the connection point of lower pivot arms 38 to the slide rail 30 and the center of the rear wheel 202. The combination of a track length of greater than 144" and minimized DL1 is unique and counterintuitive to the industry's approach of simply extending the length of the slide rails 30 to accommodate a longer track while utilizing existing suspension components.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A snowmobile suspension mountable to the chassis of a snowmobile and about which an endless track is carried, the suspension comprising:
   a slide rail for engagement with a lower portion of the endless track;
   a downwardly angled rear suspension arm having an upper end pivotally connected to the snowmobile chassis and a lower end pivotally connected to the slide rail;
   a shock absorber coupled at one end to the snowmobile chassis and at another end to the slide rail;
   a coil spring secured around at least a portion of said shock absorber; and
   an overload spring which forces the slide rail away from the chassis, wherein an overload spring force is transferred to the rear suspension arm at a location between the upper end and the lower end.

2. The snowmobile suspension of claim 1 wherein the overload spring force can be user adjusted to provide different spring force levels corresponding to a range of performance characteristics.

3. The snowmobile suspension of claim 2 wherein the overload spring force is manually adjusted by changing the location of the spring force transfer along the rear suspension arm or by changing the position of the opposite spring arm relative to a spring shaft.

4. The snowmobile suspension of claim 1 wherein the overload spring is a helical torsion spring having a spring arm which transfers the overload spring force to the suspension arm.

5. The snowmobile suspension of claim 4 wherein the helical coil spring is connected to a shaft connected to the slide rail.

6. The snowmobile suspension of claim 1 wherein the overload spring force is transferred via a slide block, and wherein a portion of the spring engages the slide block in a sliding manner.

7. The snowmobile suspension of claim 6 wherein the slide block is movable and engages the suspension arm between a plurality of positions, and the overload spring force varies with the plurality of positions corresponding to a range of performance characteristics.

8. The snowmobile suspension of claim 7 wherein the rear suspension arm includes a plurality of apertures and the slide block is retained at particular positions along the rear suspension arm by a pin engaging one of the plurality of apertures.

9. The snowmobile suspension of claim 1 wherein the rear suspension arm is at least partially positioned between an upper idler wheel coupled to the chassis and a lower wheel coupled to the slide rail, and wherein a center-to-center distance between the upper idler wheel and the lower wheel is between 21 inches and 24 inches.

10. The snowmobile suspension of claim 1 comprising a pair of shock absorbers coupled to a common axle and wherein the rear suspension arm is located between the pair of shock absorbers and coupled to said common axle.

11. The snowmobile of claim 1 comprising an upper rear idler wheel connected to the chassis and a lower rear idler pulley connected to the slide rail, wherein the upper rear idler wheel has a diameter of between 6.375 inches and 8 inches.

12. The snowmobile suspension of claim 11 further comprising an intermediate idler wheel positioned between a drive wheel and the upper rear idler wheel, wherein the intermediate idler wheel has a diameter of between 5 and 8 inches.

13. A method of adjusting the performance characteristics of a snowmobile suspension system comprising:
   providing a snowmobile having a chassis and a suspension system mounted to the chassis and about which an endless track is carried, the suspension system comprising a downwardly angled rear suspension arm having an upper end pivotally connected to the snowmobile chassis and a lower end pivotally connected to the slide rail, a coil spring and shock absorber connected between the snowmobile chassis and the slide rail, and an overload spring providing a overload spring force tending to bias the slide rail away from the chassis, wherein the overload spring force is transferred to the rear suspension arm at a location between the upper end and the lower end; and
   adjusting the location of the overload spring force transfer from a first location along the rear suspension arm to a second location along the rear suspension arm, wherein a set of performance characteristics changes as the location of the overload spring force moves between the first location and the second location.

14. The method of claim 13 wherein the spring force is transferred via a block which is selectively movable between positions along the rear suspension arm.

15. The method of claim 14 wherein the step of adjusting is achieved by selectively moving the block along the rear suspension arm.

16. The method of claim 15 further comprising:
providing a plurality of apertures spaced along the rear suspension arm and wherein the block is selectively coupled to the rear suspension arm via a pin engaging one of the plurality of apertures.

17. The method of claim 13 wherein the overload spring is a helical torsion spring having an extended arm, and wherein the extended arm transfers the overload spring force to a block connected to the rear suspension arm.

18. A method of adjusting the performance characteristics of a snow snowmobile suspension system comprising:
providing a snowmobile having a chassis and a suspension system mounted to the chassis and about which an endless track is carried, the suspension system comprising a downwardly angled rear suspension arm having an upper end pivotally connected to the snowmobile chassis and a lower end pivotally connected to a slide rail, a coil and shock absorber connected between the snowmobile chassis and the slide rail, and an overload torsion spring providing a spring force tending to bias the slide rail away from the chassis, said torsion spring having an extending arm which transfers the spring force to the suspension arm at a location between said upper end and lower end of said suspension arm;
adjusting a contact between the torsion spring arm and the rear suspension arm to occur within a first range of torsion spring arm length; and
adjusting the contact between the torsion spring arm and the rear suspension arm to occur within a second range of torsion spring arm length, wherein a set of performance characteristics changes as the torsion spring arm contact range changes.

19. A snowmobile suspension mountable to the chassis of a snowmobile and about which an endless track is carried, the suspension comprising:
a slide rail for engagement with a lower portion of the endless tract;
an upper axle connected to the chassis;
a downwardly angled rear suspension arm connected between the upper axle and the slide rail; and
an axle adjuster for maintaining the upper axle in one of a plurality of positions relative to the chassis so as to provide the rear suspension arm in one of a plurality of positions relative to the chassis.

20. The snowmobile suspension of claim 19 wherein the axle adjustor includes a plate having an aperture and a plurality of axle stops positioned at different distances away from the aperture, said plate capable of being temporarily secured to the chassis to temporarily fix the angular relationship between the upper axle, the rear suspension arm and the slide rail.

21. The snowmobile suspension of claim 19 further comprising a shock absorber connected between the upper axle and the slide rail and the axle adjuster is capable of providing the shock absorber in different angular relationships relative to the slide rail.

22. A method of adjusting the performance characteristics of a snowmobile suspension system comprising:
providing a snowmobile suspension mountable to the chassis of a snowmobile and about which an endless track is carried, the suspension having a slide rail for engagement with a lower portion of the endless tract, an axle connected to the chassis, a downwardly angled rear suspension arm connected between the axle and the slide rail, and an axle adjuster;
accessing the axle adjuster to provide the axle in a first position relative to the chassis, said first axle position providing the rear suspension arm in a particular angular position relative to the slide rail; and
accessing the axle adjustor to provide the axle in a second position relative to the chassis, said second axle position providing the rear suspension arm in a different angular position relative to the slide rail.

23. The method of claim 22 wherein the step of providing the snowmobile suspension further includes providing a shock absorber connected between the upper axle and the slide rail and wherein the steps of accessing the axle adjuster provide the shock absorber in different angular relationships relative to the slide rail.

24. A snowmobile suspension mountable to the chassis of a snowmobile and about which an endless track is carried provided according to a method comprising:
providing a track having a length of greater than 144 inches;
providing a slide rail for engagement with a lower portion of the endless track, wherein a rear idler wheel is connected at one end of the slide rail;
providing a downwardly angled rear suspension arm having an upper end pivotally connected to the snowmobile chassis and a lower end pivotally connected to the slide rail;
providing a shock absorber connected via a shock mount to the snowmobile chassis and to the slide rail, with a shock mount having an aperture through which an axle is received, with said axle supporting wheels engaging the track during use; and
locating a pivot connection of the rear suspension arm within approximately 8 inches from the rear idler wheel of the slide rail.

25. The snowmobile suspension of claim 24 wherein the pivot connection of the rear suspension arm is located within approximately 5 inches from the rear idler wheel of the slide rail.

26. A snowmobile suspension mountable to the chassis of a snowmobile and about which an endless track is carried, the suspension comprising:
a slide rail for engagement with a lower portion of the endless track having a length of greater than 144 inches;
a set of rear idler wheels carried at an end of the slide rail;
a downwardly angled rear suspension arm having an upper end pivotally connected to the snowmobile chassis and a lower end pivotally connected to the slide rail;
an overload spring providing a spring force tending to rotate the rear suspension arm away from the slide rail, said spring force being applied between an upper connection of the rear suspension arm and a lower connection of the rear suspension arm; and
a shock absorber connected between the snowmobile chassis and the slide rail, wherein the distance between the center axis of the rear idler wheels and the pivot connection of the rear suspension arm is less than 8 inches.

27. The snowmobile suspension of claim 26 wherein the shock absorber connection to the slide rail is less than 12 inches from the center axis of the set of rear idler wheels.

* * * * *

UNITED STATES PATENT AND TRADEMARK OFFICE
CERTIFICATE OF CORRECTION

PATENT NO. : 7,533,750 B2  
APPLICATION NO. : 11/540339  
DATED : May 19, 2009  
INVENTOR(S) : Simmons et al.

Page 1 of 1

It is certified that error appears in the above-identified patent and that said Letters Patent is hereby corrected as shown below:

Column 9 in the claims:

Line 14, delete "snow snowmobile" and insert --snowmobile--;

Line 40, delete "tract" and insert --track--;

Line 49, delete "adjustor" and insert --adjuster--.

Signed and Sealed this

Thirtieth Day of June, 2009

JOHN DOLL  
*Acting Director of the United States Patent and Trademark Office*